April 26, 1966 D. C. KEATHLY 3,248,024
STORAGE BIN WITH INTERLOCKING COMPONENTS
Filed April 22, 1963 2 Sheets-Sheet 2
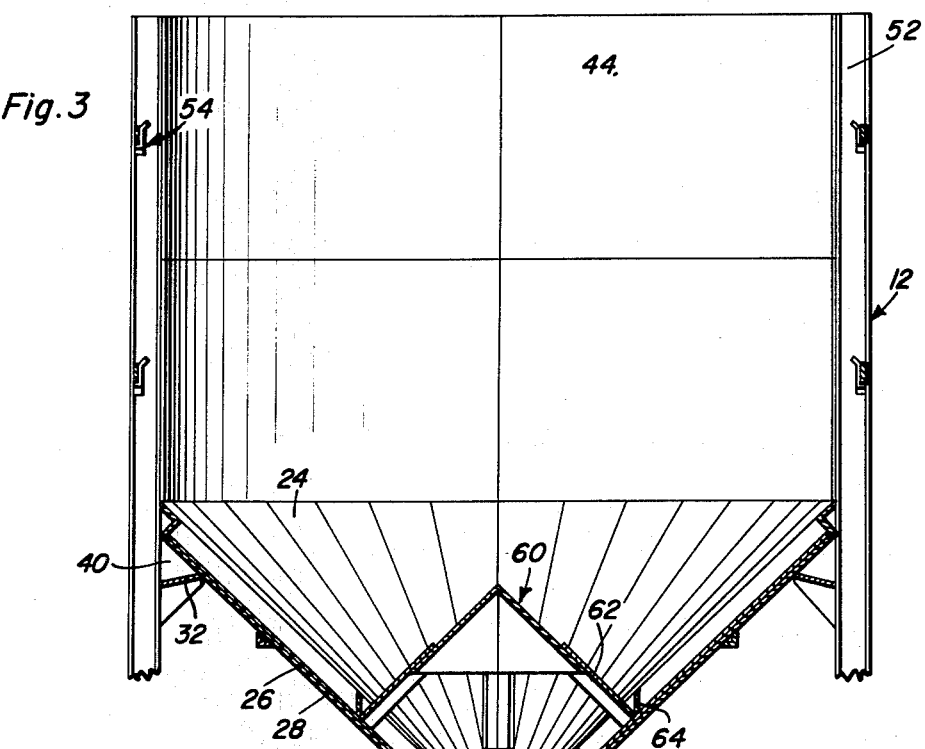
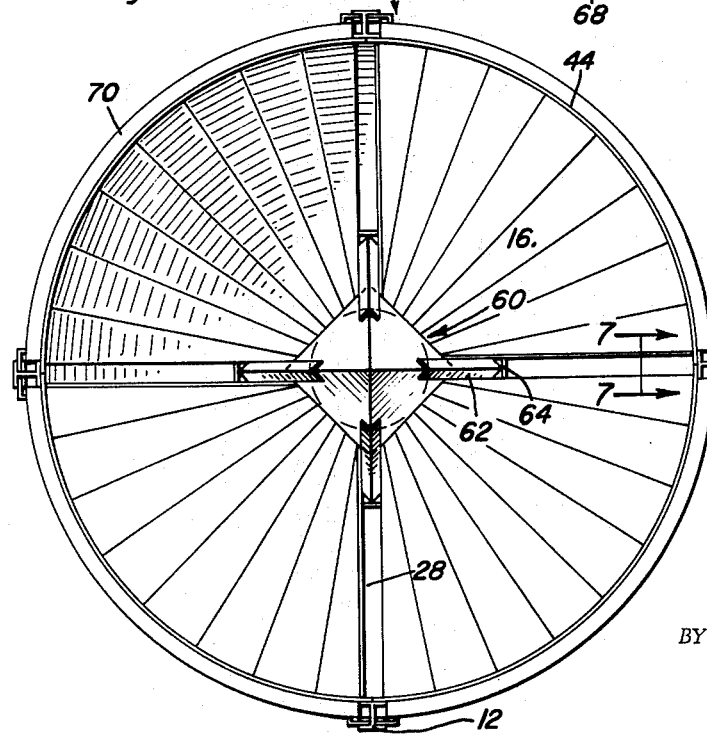
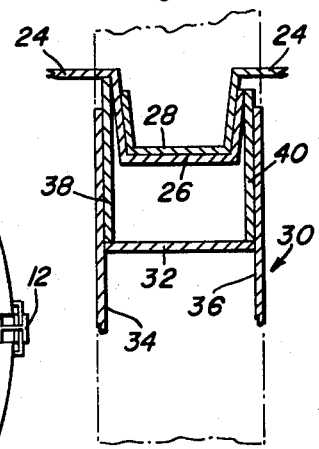
Donald C. Keathly
INVENTOR.
BY *Attorneys*

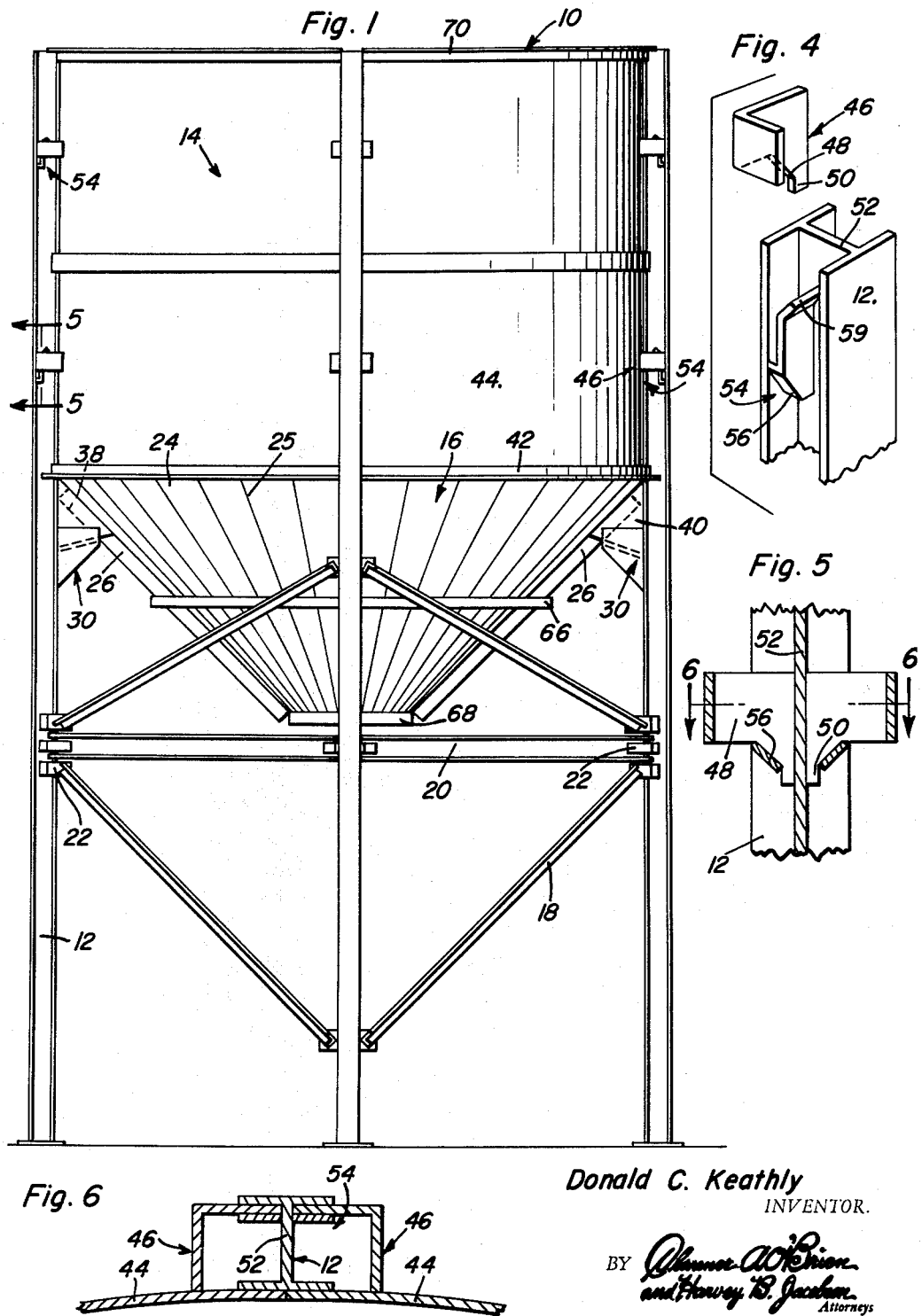

3,248,024
STORAGE BIN WITH INTERLOCKING COMPONENTS
Donald C. Keathly, Pikeville, Ky.
(3141 S. 3rd St., Louisville, Ky.)
Filed Apr. 22, 1963, Ser. No. 274,691
5 Claims. (Cl. 222—459)

This invention generally relates to a storage bin or hopper for storing and dispensing materials which may be rapidly and efficiently constructed.

It is the main object of this invention to provide a storage bin which may be erected substantially without the use of bolts or welding in the field. Any welding that is necessary may be done in the shop and the componets of the bin may be transported to its construction site wherein the components may be quickly and efficiently assembled.

In accordance with the preceding object, it is a further object of this invention to provide a storage bin or hopper including a minimum number of components which may be quickly interlocked and slid together to form the requisite structure.

Yet another object of this invention resides in the provision of a conical funnel assembly and a cylindrical storage assembly which may be constructed of interlocking segments and which may be rapidly and efficiently slid into place on a plurality of upright standards to complete the novel bin construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view in elevation of the completely assembled bin.

FIGURE 2 is a top plan view of the bin construction shown in FIGURE 1.

FIGURE 3 is a section of the bin shown in FIGURE 1 taken on a vertical plane through the longitudinal center thereof.

FIGURE 4 is a perspective view illustrating the interlocking components of the cylindrical storage area portion of the bin to the upright legs.

FIGURE 5 is a fragmentary sectional view taken substantially along the plane indicated by the line 5—5 of FIGURE 1.

FIGURE 6 is a partial sectional view taken substantially along the plane indicated by the line 6—6 of FIGURE 5.

FIGURE 7 is a fragmentary sectional view taken substantially along the plane indicated by the line 7—7 of FIGURE 2.

Referring now to the drawings in detail, the assembled storage bin is generally indicated by the numeral 10. The assembly includes a plurality of legs, each of which comprises an upstanding I-beam 12 arranged in a quadrangle as shown in FIGURE 2. Mounted between the beams 12 and spported therefrom is a generally cylindrical material storage area designated by the numeral 14 and a funnel-shaped or inverted truncated cone-shaped dispensing assembly or bottom designated generally by the numeral 16.

It should be appreciated that the upright beams 12 are preassembled in the quadrangular array previously described and then transported to the site of the construction. To maintain the predetermined relationship of the beams 12, a plurality of bracing elements such as 18 and 20 are welded to suitable brackets such as 22 on the legs. It should be appreciated, that the braces not only maintain the predetermined spacing of the beams but also substantially rigidify the construction. If desired, the beams and bracing elements may be fabricated and transported to the erection site for bolted or welded erection.

The funnel assembly 16 of the bin construction 10 is formed from a plurality of conical segments such as indicated by the numeral 24. Each of the segments 24 includes a plurality of preformed score lines such as 25 which permit the bending of the segment 24 to a shape which is substantially one-quarter of the cone surface of the funnel assembly 16. As shown in FIGURE 7, opposite edges of each conical segment 24 have integrally attached thereto generally U-shaped flanges 26 and 28. The flanges 26 and 28 on adjacent conical segments 24 are internested, as shown in FIGURE 7, to form the funnel-shaped assembly 16. Mounted on each of the beams 12 is a bracket 30 including a transverse member 32 between a pair of side plates 34 and 36. As shown in FIGURE 7, a pair of parallel plates 38 and 40 are welded or otherwise secured in the shop to opposite sides of the U-shaped flange 26. The side plates 38 and 40 are adapted to seat upon the transverse member 32 of the bracket 30. Therefore, upon completion of the funnel assembly 16 by interlocking the U-shaped flanges 26 and 28 on conical segments 24, the funnel-shaped assembly may be slid between the legs 12 of the bin structure to a position whereby the side plates 38 and 40 straddling each pair of internested flanges are seated upon the brackets 30. Each of the conical segments 24 also has mounted adjacent the top edge thereof a circular angle iron member 42 for rigidifying each of the conical segments 16.

The cylindrical storage area 14 comprises a plurality of cylindrical segments 44, each one of which comprises one-eighth of the total cylindrical surface of the storage area 14. Referring now to FIGURES 4–6, it will be seen that a generally L-shaped bracket member 46 is mounted adjacent each vertical edge of each cylindrical segment 44. By means of the brackets 46, each one of the cylindrical segments is adapted to be supported between two adjacent I-beam legs 12. The brackets 46 include a camming surface 48 terminating in a vertical projection 50 on one leg thereof. A camming lug 54 is secured to each half of each inner flange of the I-beam 12 to receive and retain the corresponding bracket 46 in a snugly mounted position. Therefore, it will be appreciated that there is a camming lug 54 in the same horizontal plane on each side of the separating web 52 of each of the I-beams 12. Furthermore, there are a second pair of such lugs in a lower horizontal plane on each of the I-beams as shown in FIGURE 1. Each of the camming lugs 54 is formed with an angled camming surface 56 and an outwardly extending camming surface 59. As shown in FIGURE 5, the bottom wall of the camming lug 54 adjacent the camming surface 56 has been cutaway to receive the vertical projection 50 on the bracket 46. Therefore, it will be appreciated that by merely interlocking the bracket 46 with the camming lug 54, the camming surface of which cams the projection 50 to extend through the opening in the bottom wall of the lug and which further mates with the camming surface 48 on the bracket 46 slidably but removably retains each of the cylindrical segments 44 between two adjacent legs.

As shown in FIGURES 1 and 3, the segments 44 first are disposed on the lower level camming lugs 54 and then the second level of segments 44 are slidably received within the second level of camming lugs 54 to complete the bin structure.

As shown in FIGURE 3 a pyramidal baffle member 60 may be placed in the funnel assembly 16 to prevent jamming of material in the funnel. The baffle member 60 is adapted to be supported by a plurality of angle iron members 62 radiating from the cone surface. The angle iron members 62 are adapted to abut the U-shaped flange 28 of the conical segment 24. To prevent upward movement of the baffle member keeper plates such as 64 may be welded within the flange 28. As shown, after assembly of the bin structure, the anti-jamming baffle member may be slipped into position until the angle iron members 62 abut the flanges 28.

It should also be noted that if desired suitable bracing elements such as 66 and 68 may be placed about the funnel-shaped assembly 16 after the completion of the assembly if desired. This may be done by bolts or welding after the assembly has been constructed and comprises the only field welding or fastening operation in the entire on-site construction process. It is also contemplated by this invention that portions of the bracing elements 68 could be welded on one of the cone sections 24 in the shop thereby completely eliminating its welding at the construction site. It should also be appreciated that any suitable door mechanism can be employed over the mouth of the funnel to enable alternate dispensing and storing of material within the bin.

To recapitulate the on-site construction of the bin, it should again be appreciated that no welding or fastening operations are necessary. The prearranged array of legs are transported to the field construction site. The conical segments 24 of the funnel assembly 16 are then interconnected by the nesting U-shaped flanges and the entire conical structure is slid into place on the legs until the plates 38, 40 straddling each of the flanged connections rest upon the transverse member 32 of the brackets 30. Then, the cylindrical segments 44 are slid into place intermediate the legs 12 until the projections 50 on the brackets 46 attached to the cylindrical segments are cammed into retained position. This is accomplished by filling two levels as shown in FIGURES 1 and 3. Finally, the baffle member 60 is placed vertically into the funnel-shaped assembly 16 until the angle iron supports 62 abut the U-shaped flanges of the connections between the conical segments 24. If desired, then any suitable bracing may be placed about the funnel assembly. If desired, suitable rigidifying circular angle iron segments 70 may be placed upon the top edge of the cylindrical segments 44 in much the same manner as the angle iron 42 is placed on the top edge of the conical segments 24.

The foregoing is considered as illustrative only of the principles of the invention. Further, since numerous modications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A knockdown storage bin assembly including at least three spaced upright legs including inner upstanding surfaces and defining a bin-receiving area therebetween, a set of bin perimeter segments joined at opposed, adjacent edges defining a material receiving bin, said legs and said opposed, adjacent edges of said segments including releasably engaged coacting interconnecting means releasably supporting said segments from said legs in elevated positions relative to the lower ends of said legs preventing downward movement of said segments relative to said legs and with the opposed, adjacent edges of said segments disposed inwardly of and in juxtaposed position relative to said legs, a bottom for said assembly, said bottom being received between said legs below said segments, second coacting means carried by said legs and said bottom and releasably supporting said bottom from said legs independently of said segments.

2. The combination of claim 1 wherein the lower marginal edge portions of said segments and the adjacent portions of said bottom are disposed in vertically aligned opposed relation.

3. A knockdown storage bin assembly including at least three spaced upright legs including inner upstanding surfaces and defining a bin-receiving area therebetween, a set of bin perimeter segments joined at opposed, adjacent edges defining a material receiving bin, said legs and said opposed, adjacent edges of said segments including releasably engaged coacting interconnecting means releasably supporting said segments from said legs in elevated positions relative to the lower ends of said legs preventing downward movement of said segments relative to said legs and with the opposed, adjacent edges of said segments disposed inwardly of and in juxtaposed position relative to said legs, a bottom for said assembly, said bottom being received between said legs below said segments, second coacting means carried by said legs and said bottom and releasably supporting said bottom from said legs independently of said segments, said segments defining a generally cylindrical bin body, said bottom defining a hollow generally inverted truncated cone-shaped member open at its upper and lower ends and disposed with its major diameter portion uppermost.

4. The combination of claim 3 including a generally pyramidal baffle member supported from and in the lower portion of said bottom with its lower major diameter portion in alignment with and spaced above the open lower end of said bin body.

5. A knockdown storage bin assembly including at least three spaced upright legs including inner upstanding surfaces and defining a bin-receiving area therebetween, a set of bin perimeter segments joined at opposed, adjacent edges defining a material receiving bin, said legs and said opposed, adjacent edges of said segments including releasably engaged coacting interconnecting means releasably supporting said segments from said legs in elevated positions relative to the lower ends of said legs preventing downward movement of said segments relative to said legs and with the opposed, adjacent edges of said segments disposed inwardly of and in juxtaposed position relative to said legs, a bottom for said assembly, said bottom being received between said legs below said segments, second coacting means carried by said legs and said bottom and releasably supporting said bottom from said legs independently of said segments, said segments defining a generally cylindrical bin body, said bottom defining a hollow generally inverted truncated cone-shaped member open at its upper and lower ends and disposed with its major diameter portion uppermost, said bottom being defined by a plurality of truncated cone-shaped perimeter segments extending between pairs of adjacent legs of said assembly and vertically aligned with the corresponding bin segments, adjacent edge portions of said bottom segments including interlocking portions releasably securing said bottom segments together and comprising portions of said second coacting means, the other portions of said second coacting means comprising means carried by said legs and engaged with said interlocking portions of said bottom segments.

References Cited by the Examiner

UNITED STATES PATENTS

| | | | |
|---|---|---|---|
| 1,271,420 | 7/1918 | Bewan | 222—564 |
| 1,754,516 | 4/1930 | Johnson | 52—194 |
| 1,840,942 | 1/1932 | Fahrenwald | 52—282 |
| 2,154,661 | 4/1939 | Briggs | 220—4 |
| 3,026,977 | 3/1962 | Pollock et al. | 52—481 |
| 3,054,362 | 9/1962 | Seidle | 220—4 |

FRANK L. ABBOTT, *Primary Examiner.*

LOUIS J. DEMBO, RICHARD W. COOKE, JR.,
*Examiners.*